United States Patent [19]

Brando

[11] 4,185,854
[45] Jan. 29, 1980

[54] OSCILLATING DOUBLE AXLE ASSEMBLY

[76] Inventor: Gérard Brando, 8 rue Edgard Quinet, 42100 Saint-Etienne, Loire, France

[21] Appl. No.: 791,981

[22] Filed: Apr. 28, 1977

[51] Int. Cl.$^2$ .............................................. B60G 11/14
[52] U.S. Cl. .................................... 280/677; 280/679; 105/182 R
[58] Field of Search ........................... 280/677, 679; 105/182 R, 199 R, 218 A; 308/202–218, 180

[56] References Cited

U.S. PATENT DOCUMENTS

| | | | |
|---|---|---|---|
| 2,488,002 | 11/1949 | Carraher | 280/677 |
| 2,680,625 | 6/1954 | Richardson | 280/677 |
| 2,775,466 | 12/1956 | Meewes | 280/677 |
| 3,241,855 | 3/1966 | Kersey | 280/679 |
| 3,810,516 | 5/1974 | Reimer | 280/677 |

Primary Examiner—Philip Goodman
Attorney, Agent, or Firm—Haseltine, Lake & Waters

[57] ABSTRACT

An oscillating double axle assembly comprising a bogie chassis including a transverse beam and two longitudinal beams, with a central pivot assembly located in alignment with the transverse beam and supporting each longitudinal beam for pivotal movement with respect thereto. An arm is centrally mounted on the central pivot assembly for free pivotal movement and the arm rotatably carries at its opposite ends wheels at equal spacing from the central pivot assembly. A spring assembly is secured to the arms and to the longitudinal beams to resist relative movement therebetween. One embodiment contemplates a reinforcement tube which extends from the ends of the transverse beam and which supports the arms through the intermediary of roller bearings. An elastic system resists relative rotation between the arms and the reinforcement tube. In another embodiment, a solid shaft extends from each end of the transverse beam and supports the arm through the intermediary of a roller bearing, each shaft being secured to a respective longitudinal beam.

13 Claims, 6 Drawing Figures

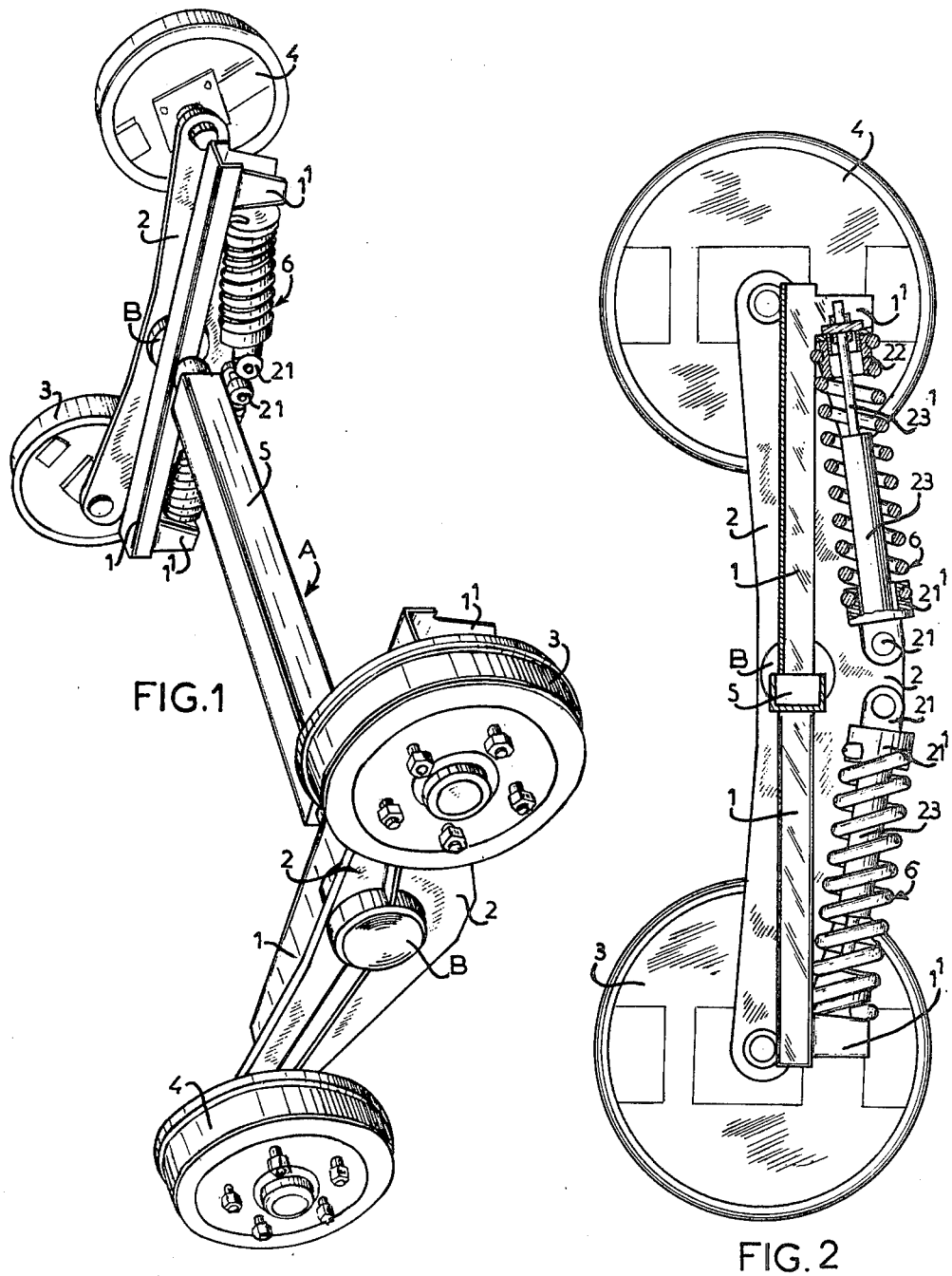

OSCILLATING DOUBLE AXLE ASSEMBLY

FIELD OF THE INVENTION

The present invention relates to an oscillating double axle assembly and principally to the technical field of vehicles, in general, and more particularly to vehicle wheels, to their axles, and to the improvement of contact of the wheels with the rails.

BACKGROUND AND SUMMARY OF THE INVENTION

According to the invention, it is desired to create an energy absorption, by overcoming inequalities of the terrain while retaining a complete and constant distribution of the load received by the axle to the two wheels. Thereby there are eliminated errors resulting from an assembly formed by two opposed axles whose operation under the same unfavorable conditions, leads to substantially unequal distribution of loads, thus producing substantial wear of the axle closest to the point of traction.

The oscillating double axle assembly according to the invention, comprises a bogie chassis having longitudinal beams which respectively support for free articulation by a central pivot assembly, the center of an arm of triangular or other judiciously profiled shape supporting at each extremity the center of wheels equidistant from the pivot assembly, said pivot assembly being positioned in facing relation with respect to a transverse beam of the bogie chassis; one or more spings for stabilization and for compensation being secured to said triangular arms and to the longitudinal beams.

According to a first embodiment of the invention, the central pivot assembly comprises a solid shaft engaged at each extremity of the transverse beam, said shaft being fitted at its extremities to receive bearings having conical rollers fixed by nuts, each of said bearings being engaged in a rotatable casing mounted in an axial opening in an associated triagular arm, said casings being externally secured, for example, by welding to said arms.

According to another embodiment, the central pivot assembly comprises a reinforcement tube secured at each extremity with the transverse beams, said reinforcement tube being fitted at each extremity to receive bearings having conical rollers fixed by nuts, each of said bearings being supported in a rotatable casing mounted in an axial opening in an associated triangular arm, said casings being externally secured, for example, by welding to said arms.

In this latter embodiment, the reinforcement tube receives internally either a suitable torsion bar mounted by any known means or a bar of square section with flexible rods having a capability of elastic deformation, said rods being mounted between the external perimeter of the bar and the internal wall of the reinforcement tube.

BRIEF DESCRIPTION OF THE DRAWING

FIG. 1 is a perspective view of the double oscillating axle assembly according to the invention.

FIG. 2 is a front view in partial section of one of the axle assemblies of FIG. 1.

DETAILED DESCRIPTION

Figure 3:
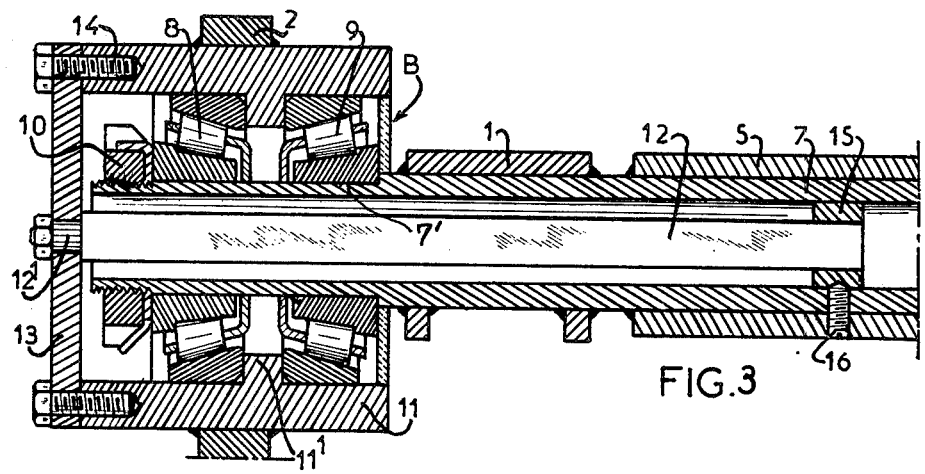
FIG. 3 is a longitudinal sectional view of one extremity of the central pivot assembly according to an embodiment with a torsion bar.

FIG. 1 shows an oscillating double axle assembly comprising a bogie chassis A having two longitudinal beams 1 respectively supporting for free articulation, by means of a central pivot assembly B, and arm 2 of triangular or other judiciously profiled shape. The arms 2 support at each extremity the centers of wheels 3 and 4 equidistant from the central pivot assembly B which is positioned in facing relation with a transverse beam 5 of the bogie chassis A.

Springs 6 for stabilization and compensation are fixed to the triangular arms and to the extremities of the lateral beams 1.

Figures 5, 6:
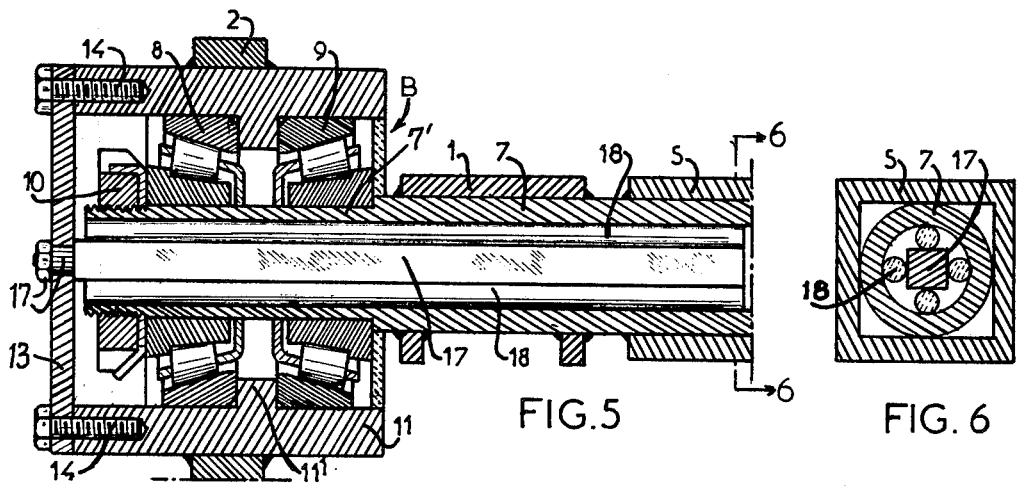
FIG. 5 is a longitudinal sectional view of an extremity of the central pivot assembly according to an embodiment with a bar of square section with flexible rods capable of elastic deformation.
FIG. 6 is a sectional view taken along line 6—6 in FIG. 5.

In the embodiments illustrated in FIGS. 3 and 5, the central pivot assembly B comprises an inner reinforcement tube 7 secured at each extremity to the transverse beam 5 e.g. by welding.

The reinforcement tube is reduced in diameter at 7' at each extremity to receive bearings having conical rollers 8 and 9 axially secured, for example, by nuts 10 on the tube 7.

The bearings 8 and 9 are supported in a rotatable casing 11 having an inner collar 11' which forms a support for the rollers 8 and 9. The rotatable casing 11 is engaged in an axial opening in the arm 2 and is externally secured to the arm 2, for example, by welding.

As illustrated in FIG. 3, the tube 7 internally receives at each extremity a torsion bar 12 of polygon section coupled at one of its ends by spline 12' to a plate 13 fixed by screws 14 to the front face of the rotatable casing 11. The other extremity of the torsion bar 12 of polygon section is integral with a ring 15 fixed to the interior of the reinforcement tube 7 by means of a pointed screw 16. It is to be noted that the torsion bar 12 is mounted with play in the tube 7 to undergo torsional deformation at the time of angular displacement of one of the arms 2 and consequently of one of the casings 11.

In the embodiment of FIGS. 5 and 6, the reinforcement tube 7 internally receives, at each extremity, a bar 17 of square section coupled at one of its extremities by means of spline 17' to plate 13 fixed to the rotatable casing 11, the other extremity of the bar 17 not being fixed in the tube 7.

Between the exterior surface of the bar 17 and the internal wall of the reinforcement tube 7 there are mounted flexible rods 18 with capability of displacement and of elastic deformation.

Figure 4:
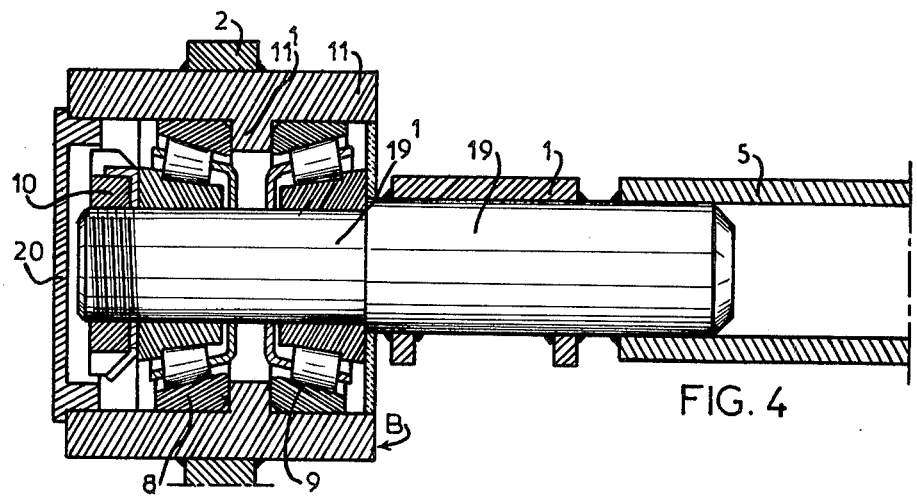
FIG. 4 is a longitudinal sectional view of an extremity of the central pivot assembly according to an embodiment with a solid shaft.

According to the embodiment of FIG. 4, the central pivot assembly B comprises a solid shaft 19 secured at each extremity with the transverse beam 5, e.g. by welding. The shaft 19 has at one of its extremities a portion of reduced diameter 19' receiving, as in the preceeding embodiments, the bearings with conical rollers 8 and 9 supported in the casing 11. It is to be noted that in this embodiment, the rotatable casings 11 simply have a closure cover 20 force-fitted in the casings.

The longitudinal beams 1 are fixed, by any known means, to the reinforcement tubes 7 or to the solid shafts 19, between the transverse beam 5 and the rotatable casings 11, the transverse beam 5 being externally secured by welding to the reinforcement tubes 7 or the solid shafts 19.

In a known manner and as disclosed in French Application, No. 9794 of which the applicant of the present application is also the owner, the end coils of the stabilization and compensation springs 6 are threaded at one end in a helicoidal groove in a cylindrical head 21' mounted on a transverse axle support 21 fixed to the arm 2 and at the other end in a helicoidal groove on a collar 22 threaded on a vertical flange 1' at the extremity of the longitudinal beam 1.

In a variation, cylinders 23 of hydraulic shock absorbers are fixed to the transverse axle support 21 and their piston rods 23' are secured to the collar 22. The shock absorbers are engaged in the interior of the stabilization and compensation springs 6.

According to another feature of the invention, the middle of wheels 3 and 4 equidistant from the central pivot assembly B, are mounted at each extremity of arms 2 either above the bogie chassis A to raise the center of gravity or below the bogie chassis to raise the bogie chassis with respect to the ground and provide greater ground clearance.

The operation of the oscillating double axle assembly according to the invention is as follows.

Due to inequalities of the terrain, deformation of the assembly is effected by displacement of one wheel which produces, by the angular pivoting of one of the arms 2 around the central pivot assembly B, a compression or an extension of the elastic elements of the axle assembly, this movement having equal value in the two cases. This effect therefore produces an absorption by elimination of the inequalities of the terrain while retaining a constant distribution, in total, of the load received by the axle on the two wheels.

It is clear that without departing from the framework of the invention, the oscillating double axle assembly can be formed of any size. Furthermore, in the case of the embodiment of the torsion bar or the bar with the flexible rods capable of deformation and elastic displacement housed in the transverse beam, the stabilization and compensation springs can be eliminated.

The invention is not limited to the specifically disclosed embodiments nor to the specific means shown, but it in contrast embraces all variations and modifications falling within the spirit and scope of the appended claims.

What is claimed is:

1. An oscillating double axle assembly comprising a bogie chassis including a transverse beam and two longitudinal beams, a central pivot assembly associated with each longitudinal beam and located in alignment with said transverse beam, an arm centrally mounted on each pivot assembly for free pivotal movement, said arm having opposite ends, wheels rotatably mounted at the ends of said arms at equal spacing from said central pivot assembly, and elastic means secured to said arms and to said longitudinal beams for opposing pivotal movement of said arms, said elastic means comprising two stabilization and compensation coil springs for each arm, said coil springs being respectively secured to said arm near said pivot assembly and at remote ends to respective ends of the associated said longitudinal beam in opposition to one another.

2. An axle assembly as claimed in claim 1 wherein said central pivot assemblies comprise a common reinforcement tube having opposite ends secured to respective longitudinal beams fnd roller bearing means supporting said arms on said tube.

3. An axle assembly as claimed in claim 2 wherein said roller bearing means comprises conical rollers axially secured on each of said ends of the tube and a casing supporting said conical rollers, said casing being engaged in an opening provided in a respective arm and secured therein.

4. An axle assembly as claimed in claim 3 wherein each said central pivot assembly comprises a torsion bar having one end secured to said casing and an opposite end secured to said tube.

5. An axle assembly as claimed in claim 3 wherein each said central pivot assembly comprises a bar of square section, secured at one end to said casing, the other end of the bar being free and projecting in said tube, and flexible rods between said bar and said tube, said flexible rods being elastically deformable and undergoing deformation upon relative rotation of said bar and tube.

6. An axle assembly as claimed in claim 3 wherein said longitudinal beams are fixed to said tube between said transverse beam and the associated casing, said transverse beam being welded to said tube.

7. An axle assembly as claimed in claim 1 wherein each said central pivot assembly includes a solid shaft secured to said transverse beam and extending from the ends thereof, roller bearing means supporting each arm on a respective solid shaft, and means securing each shaft to a respective longitudinal beam.

8. An axle assembly as claimed in claim 7 wherein said longitudinal beams are mounted between said roller bearings and said transverse beam.

9. An axle assembly as claimed in claim 1 wherein said central pivot assembly associated with each beam comprises means including roller bearings supporting the associated said arm rotatably with respect to said transverse beam.

10. An axle assembly as claimed in claim 1 wherein said axle assembly further comprises shock absorber means secured to said arms and to said longitudinal beams extending within said coil springs.

11. An axle assembly as claimed in claim 1 wherein said elastic means further comprises a cylindrical head pivotably mounted on said arm and having a helicoidal groove threadably receiving one end of an associated coil spring, and a sleeve threadably secured to said longitudinal beam at an end thereof and having a helicoidal groove threadably receiving an opposite end of said coil spring.

12. An axle assembly as claimed in claim 1 wherein the centers of the wheels equidistant from the central pivot assemblies are mounted on said arms above the bogie chassis to raise the center of gravity.

13. An axle assembly as claimed in claim 1 wherein the centers of the wheels equidistant from the central pivot assemblies are mounted on said arms below the bogie chassis to raise the bogie chassis and provide maximum clearance thereof with the ground.

* * * * *